United States Patent
Yoon et al.

(10) Patent No.: US 12,030,227 B2
(45) Date of Patent: Jul. 9, 2024

(54) LATEX COMPOSITION FOR DIP MOLDING, MOLDED ARTICLE MOLDED FROM LATEX COMPOSITION FOR DIP MOLDING, AND METHOD OF PRODUCING MOLDED ARTICLE

(71) Applicant: LG Chem, Ltd., Seoul (KR)

(72) Inventors: Tae Shik Yoon, Daejeon (KR); Won Sang Kwon, Daejeon (KR); Seung Uk Yeu, Daejeon (KR); Seung Whan Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 337 days.

(21) Appl. No.: 17/416,203

(22) PCT Filed: Sep. 1, 2020

(86) PCT No.: PCT/KR2020/011698
§ 371 (c)(1),
(2) Date: Jun. 18, 2021

(87) PCT Pub. No.: WO2021/071092
PCT Pub. Date: Apr. 15, 2021

(65) Prior Publication Data
US 2022/0055256 A1   Feb. 24, 2022

(30) Foreign Application Priority Data

Oct. 7, 2019   (KR) .................. 10-2019-0123605

(51) Int. Cl.
| | |
|---|---|
| B29C 41/14 | (2006.01) |
| B29C 41/00 | (2006.01) |
| B29C 41/22 | (2006.01) |
| B29C 41/52 | (2006.01) |
| C08L 13/02 | (2006.01) |
| B29K 19/00 | (2006.01) |

(52) U.S. Cl.
CPC ............ *B29C 41/14* (2013.01); *B29C 41/003* (2013.01); *B29C 41/22* (2013.01); *B29C 41/52* (2013.01); *C08L 13/02* (2013.01); *B29K 2019/00* (2013.01)

(58) Field of Classification Search
CPC ....... B29C 41/14; B29C 41/003; B29C 41/22; B29C 41/52; C08L 13/02; C08L 7/02; C08L 13/00; B29K 2019/00; B29K 2007/00; B29K 2105/0064; B29L 2031/4864; B29L 2022/002; C08K 5/39; C08K 3/22; C08K 3/06; C08K 2003/2241; C08K 2003/2296; C08F 236/06; C08F 236/12; C08J 2313/02; C08J 5/02

See application file for complete search history.

(56) References Cited

U.S. PATENT DOCUMENTS

| | | |
|---|---|---|
| 2011/0191936 A1 | 8/2011 | Lipinski et al. |
| 2016/0263783 A1 | 9/2016 | Foo |
| 2017/0156422 A1* | 6/2017 | Honjo .................. A41D 19/001 |
| 2017/0298210 A1 | 10/2017 | Joe et al. |
| 2018/0332910 A1 | 11/2018 | Modha et al. |
| 2021/0169160 A1 | 6/2021 | Wong et al. |

FOREIGN PATENT DOCUMENTS

| | | |
|---|---|---|
| EP | 1904569 B1 | 3/2013 |
| JP | H07266489 A | 10/1995 |
| JP | 2007231428 A | 9/2007 |
| KR | 100668691 B1 | 1/2007 |
| KR | 20100060790 A | 6/2010 |
| KR | 20110053980 A | 5/2011 |
| KR | 20120086927 A | 8/2012 |
| KR | 20160076988 A | 7/2016 |
| KR | 20180094918 A | 8/2018 |
| KR | 20190044824 A | 5/2019 |
| WO | 2019139467 A1 | 7/2019 |

OTHER PUBLICATIONS

International Search Report for Application No. PCT/KR2020/011698 mailed Dec. 7, 2020, pp. 1-3.
Extended European Search Report for EP20875548 dated Jan. 14, 2022, 2 pgs.

* cited by examiner

*Primary Examiner* — James C Yager
(74) *Attorney, Agent, or Firm* — Lerner David LLP

(57) ABSTRACT

A dip-molded article includes an external molded layer and internal molded layer. The external molded layer includes a content of an ethylenically unsaturated nitrile-based monomer-derived repeating unit is 35 wt % to 60 wt %, and the internal molded layer in which a content of an ethylenically unsaturated nitrile-based monomer-derived repeating unit is 10 wt % to 28 wt %.

6 Claims, No Drawings

LATEX COMPOSITION FOR DIP MOLDING, MOLDED ARTICLE MOLDED FROM LATEX COMPOSITION FOR DIP MOLDING, AND METHOD OF PRODUCING MOLDED ARTICLE

CROSS-REFERENCE TO RELATED APPLICATIONS

The present application is a national stage entry of International Application No. PCT/KR2020/011698 filed on Sep. 1, 2020, which claims priority to Korean Patent Application No. 10-2019-0123605, filed on Oct. 7, 2019, the entire contents of which are incorporated herein by reference.

TECHNICAL FIELD

The present invention relates to a dip-molded article, and more particularly, to the dip-molded article, a latex composition for dip molding to produce the dip-molded article, and a method of producing the dip-molded article.

BACKGROUND ART

Use of a nitrile-based rubber glove is rapidly spreading in various industrial fields such as medical, food, chemical, and electronics industries and daily life. Glove manufacturers have been continually striving to develop gloves with diversified qualities for various purposes to keep pace with customers and market changes.

A natural rubber glove has excellent wearability due to its low modulus and high elastic properties. The natural rubber glove has been used for medical and surgical purposes for a long period of time based on these advantages, but the natural rubber glove is disadvantageous in terms of very low chemical resistance as well as oil resistance. In addition, a protein contained in natural rubber causes a specific allergic reaction and a skin rash, and the natural rubber glove is thus limited in use.

The nitrile-based rubber glove is advantageous in terms of protection of a skin even in various work environments due to its excellent chemical resistance and oil resistance. However, a user feels stiffness when wearing (donning) the glove due to high modulus of the nitrile-based rubber glove, and the user likely feels fatigue of a hand when wearing the glove for a long time. In addition, since the glove does not tightly adhere to a hand due to its low elasticity, it is not suitable for work requiring delicacy.

As such, the rubber glove is required to have excellent wearability and chemical resistance, but it is very difficult to develop and manufacture a glove satisfying both these physical properties.

DISCLOSURE

Technical Problem

In order to solve the problems mentioned in the background art, an object of the present invention is to improve both wearability and chemical resistance of a dip-molded article.

That is, an object of the present invention is to provide a dip-molded article having both improved wearability and chemical resistance by forming a plurality of layers using a latex composition for dip molding including ethylenically unsaturated nitrile-based monomers in different contents, and a method of producing the same.

Technical Solution

In one general aspect, a dip-molded article includes an external molded layer in which a content of an ethylenically unsaturated nitrile-based monomer-derived repeating unit is 35 wt % to 60 wt %, and an internal molded layer in which a content of an ethylenically unsaturated nitrile-based monomer-derived repeating unit is 10 wt % to 28 wt %.

In another general aspect, a method of producing a dip-molded article includes a step S10 of attaching a coagulant to a dip molding mold; a step S20 of dipping the dip molding mold to which the coagulant is attached into a first latex composition for dip molding to form a layer derived from the first latex composition for dip molding; a step S30 of dipping the dip molding mold in which the layer derived from the first latex composition for dip molding is formed into a second latex composition for dip molding to form a layer derived from the second latex composition for dip molding; and a step S40 of heating the layer derived from the first latex composition for dip molding and the layer derived from the second latex composition for dip molding to cross-link the first latex composition for dip molding and the second latex composition for dip molding, wherein the first latex composition for dip molding includes a carboxylic acid-modified nitrile-based copolymer latex in which a content of an ethylenically unsaturated nitrile-based monomer-derived repeating unit is 35 wt % to 60 wt %, and the second latex composition for dip molding includes a carboxylic acid-modified nitrile-based copolymer latex in which a content of an ethylenically unsaturated nitrile-based monomer-derived repeating unit is 10 wt % to 28 wt %.

Advantageous Effects

The dip-molded article according to the present invention includes the external molded layer including the ethylenically unsaturated nitrile-based monomer-derived repeating unit in a high content and the internal molded layer including the ethylenically unsaturated nitrile-based monomer-derived repeating unit in a low content, such that excellent wearability and chemical resistance may be simultaneously implemented.

BEST MODE

The terms and words used in the description and claims of the present invention are not to be construed as general or dictionary meanings but are to be construed as meanings and concepts meeting the technical ideas of the present invention based on a principle that the inventors can appropriately define the concepts of terms in order to describe their own inventions in the best mode.

Hereinafter, the present invention will be described in more detail in order to assist in the understanding of the present invention.

The term "monomer-derived repeating unit" in the present invention may refer to a component or structure derived from a monomer or a material itself, and may refer to a repeating unit formed in a polymer by an added monomer participating in a polymerization reaction during polymerization of the polymer.

The term "latex" in the present invention may refer to that a polymer or a copolymer polymerized by polymerization is present in a form dispersed in water. As a specific example, the term "latex" may refer to that fine particles of a rubber-like polymer or fine particles of a rubber-like copolymer polymerized by emulsion polymerization are present in a colloidal state in which the fine particles are dispersed in water.

The term "layer derived" in the present invention may refer to a layer formed from a polymer or a copolymer. As a specific example, the term "layer derived" may refer to a layer formed from a polymer or a copolymer by attaching, fixing, and/or polymerizing the polymer or the copolymer on a dip molding mold when producing a dip-molded article.

According to the present invention, a dip-molded article is provided. The dip-molded article may include an external molded layer in which a content of an ethylenically unsaturated nitrile-based monomer-derived repeating unit is 35 wt % to 60 wt %; and an internal molded layer in which a content of an ethylenically unsaturated nitrile-based monomer-derived repeating unit is 10 wt % to 28 wt %.

According to an exemplary embodiment of the present invention, in the dip-molded article, the external molded layer may refer to a layer in direct contact with an external environment and an external material. As such, the external molded layer in direct contact with the external environment and the external material is required to have not only stress (modulus) and tensile properties that are related to wearability but also excellent chemical resistance. In a case where an organic solvent is dealt with using a dip-molded article in which such an excellent chemical resistance is not implemented for a long time, the molded article may become loose and torn. Therefore, in the present invention, the external molded layer is produced so that the external molded layer includes 35 wt % to 60 wt % of an ethylenically unsaturated nitrile-based monomer-derived repeating unit, that is, the ethylenically unsaturated nitrile-based monomer-derived repeating unit in a high content, such that excellent tensile properties and chemical resistance may be simultaneously implemented.

An ethylenically unsaturated nitrile-based monomer constituting the ethylenically unsaturated nitrile-based monomer-derived repeating unit may be one or more selected from the group consisting of acrylonitrile, methacrylonitrile, fumaronitrile, α-chloronitrile, and α-cyanoethylacrylonitrile. As a specific example, the ethylenically unsaturated nitrile-based monomer may be acrylonitrile or methacrylonitrile, and as a more specific example, the ethylenically unsaturated nitrile-based monomer may be acrylonitrile.

According to an exemplary embodiment of the present invention, a content of the ethylenically unsaturated nitrile-based monomer-derived repeating unit may be 35 wt % to 55 wt %, 35 wt % to 50 wt %, or 35 wt % to 45 wt %, with respect to a total content of the external molded layer. The ethylenically unsaturated nitrile-based monomer-derived repeating unit is included in the external molded layer within the above content range, excellent wearability may be implemented, and chemical resistance may also be improved.

According to an exemplary embodiment of the present invention, the external molded layer may further include a conjugated diene-based monomer-derived repeating unit and an ethylenically unsaturated acid monomer-derived repeating unit, in addition to the ethylenically unsaturated nitrile-based monomer-derived repeating unit.

A conjugated diene-based monomer constituting the conjugated diene-based monomer-derived repeating unit may be one or more selected from the group consisting of 1,3-butadiene, 2,3-dimethyl-1,3-butadiene, 2-ethyl-1,3-butadiene, 1,3-pentadiene, and isoprene. As a specific example, the conjugated diene-based monomer may be 1,3-butadiene or isoprene, and as a more specific example, the conjugated diene-based monomer may be 1,3-butadiene.

A content of the conjugated diene-based monomer-derived repeating unit may be 30 wt % to 65 wt %, 35 wt % to 65 wt %, or 40 wt % to 60 wt %, with respect to the total content of the external molded layer. Within these ranges, a dip-molded article is flexible and has not only excellent texture and wearability but also excellent oil resistance and tensile strength.

In addition, according to an exemplary embodiment of the present invention, an ethylenically unsaturated acid monomer constituting the ethylenically unsaturated acid monomer-derived repeating unit may be an ethylenically unsaturated monomer having an acid group such as a carboxyl group, a sulfonic acid group, or an acid anhydride group. As a specific example, the ethylenically unsaturated acid monomer may be one or more selected from the group consisting of an ethylenically unsaturated acid monomer such as acrylic acid, methacrylic acid, itaconic acid, maleic acid, or fumaric acid; polycarboxylic acid anhydride such as maleic acid anhydride or citraconic acid anhydride; an ethylenically unsaturated sulfonic acid monomer such as styrenesulfonic acid; and an ethylenically unsaturated polycarboxylic acid partial ester monomer such as monobutyl fumarate, monobutyl maleate, or mono-2-hydroxypropyl maleate. As a more specific example, the ethylenically unsaturated acid monomer may be one or more selected from the group consisting of acrylic acid, methacrylic acid, itaconic acid, maleic acid, and fumaric acid. As a still more specific example, the ethylenically unsaturated acid monomer may be methacrylic acid. The ethylenically unsaturated acid monomer may be used in a form of a salt such as an alkali metal salt or an ammonium salt during polymerization.

A content of the ethylenically unsaturated acid monomer-derived repeating unit may be 0.1 wt % to 10 wt %, 0.5 wt % to 9 wt %, or 2 wt % to 8 wt %, with respect to the total content of the external molded layer. Within these ranges, the dip-molded article is flexible and has excellent wearability, and polymerization stability and tensile strength are excellent.

According to an exemplary embodiment of the present invention, the external molded layer may further include an ethylenically unsaturated monomer-derived repeating unit formed of another ethylenically unsaturated monomer copolymerizable with the ethylenically unsaturated nitrile-based monomer and the ethylenically unsaturated acid monomer.

The ethylenically unsaturated monomer constituting the ethylenically unsaturated monomer-derived repeating unit may be one or more selected from the group consisting of a vinyl aromatic monomer selected from the group consisting of styrene, arylstyrene, and vinyl naphthalene; fluoroalkyl vinyl ether such as fluoro ethyl vinyl ether; an ethylenically unsaturated amide monomer selected from the group consisting of (meth)acrylamide, N-methylol (meth) acrylamide, N,N-dimethylol (meth) acrylamide, N-methoxymethyl (meth) acrylamide, and N-propoxymethyl (meth)acrylamide; a non-conjugated diene monomer such as vinyl pyridine, vinyl norbornene, dicyclopentadiene, or 1,4-hexadiene; and an ethylenically unsaturated carboxylic acid ester monomer selected from the group consisting of methyl (meth) acrylate, ethyl (meth)acrylate, butyl (meth)acrylate, 2-ethylhexyl (meth)acrylate, trifluoroethyl (meth) acrylate, tetrafluoropropyl (meth) acrylate, dibutyl maleate, dibutyl fumarate, diethyl maleate, methoxymethyl (meth) acrylate, ethoxyethyl (meth) acrylate, methoxyethoxyethyl (meth) acrylate, cyanomethyl (meth)acrylate, 2-cyanoethyl (meth) acrylate, 1-cyanopropyl (meth) acrylate, 2-ethyl-6-cyanohexyl (meth) acrylate, 3-cyanopropyl (meth) acrylate, hydroxyethyl (meth) acrylate, hydroxypropyl (meth)acrylate, glycidyl (meth)acrylate, and dimethylamino ethyl (meth) acrylate.

A content of the ethylenically unsaturated monomer-derived repeating unit may be within 20 wt %, 0.01 wt % to 20 wt %, or 0.01 wt % to 15 wt %, with respect to the total content of the external molded layer. Within these ranges, the dip-molded article has not only excellent texture and wearability but also excellent tensile strength.

According to an exemplary embodiment of the present invention, in the dip-molded article, the internal molded layer may refer to a layer in contact with a part of a body of a user who wears a dip-molded article. As such, the internal molded layer in contact with the part of the body of the user is required to have excellent wearability. To this end, in the present invention, the internal molded layer is produced so that the internal molded layer includes 10 wt % to 28 wt % of an ethylenically unsaturated nitrile-based monomer-derived repeating unit, that is, the ethylenically unsaturated nitrile-based monomer-derived repeating unit in a low content, and includes a high content of a conjugated diene-based monomer-derived repeating unit which may implement wearability improvement, such that a dip-molded article is flexible and has not only excellent texture and wearability but also excellent oil resistance and tensile strength.

Detailed description of an ethylenically unsaturated nitrile-based monomer constituting the ethylenically unsaturated nitrile-based monomer-derived repeating unit included in the internal molded layer may be the same as that of the ethylenically unsaturated nitrile-based monomer constituting the ethylenically unsaturated nitrile-based monomer-derived repeating unit included in the external molded layer described above. In this case, the ethylenically unsaturated nitrile-based monomers constituting the ethylenically unsaturated nitrile-based monomer-derived repeating units included in the external molded layer and the internal molded layer may be the same as or different from each other. As a specific example, the ethylenically unsaturated nitrile-based monomer included in the internal molded layer may be acrylonitrile.

According to an exemplary embodiment of the present invention, a content of the ethylenically unsaturated nitrile-based monomer-derived repeating unit may be 13 wt % to 28 wt %, 15 wt % to 28 wt %, or 20 wt % to 28 wt %, with respect to a total content of the internal molded layer. The ethylenically unsaturated nitrile-based monomer-derived repeating unit is included in the internal molded layer within the above content range, excellent wearability may be implemented, and chemical resistance may also be maintained.

According to an exemplary embodiment of the present invention, the internal molded layer may further include a conjugated diene-based monomer-derived repeating unit and an ethylenically unsaturated acid monomer-derived repeating unit, in addition to the ethylenically unsaturated nitrile-based monomer-derived repeating unit.

Detailed description of a conjugated diene-based monomer constituting the conjugated diene-based monomer-derived repeating unit included in the internal molded layer may be the same as that of the conjugated diene-based monomer constituting the conjugated diene-based monomer-derived repeating unit included in the external molded layer described above. In this case, the conjugated diene-based monomers constituting the conjugated diene-based monomer-derived repeating units included in the external molded layer and the internal molded layer may be the same as or different from each other. As a specific example, the conjugated diene-based monomer included in the internal molded layer may be 1,3-butadiene.

A content of the conjugated diene-based monomer-derived repeating unit may be 60 wt % to 90 wt %, 65 wt % to 85 wt %, or 67 wt % to 80 wt %, with respect to the total content of the internal molded layer. Within these ranges, a dip-molded article is flexible and has not only excellent texture and wearability but also excellent chemical resistance and tensile strength.

According to an exemplary embodiment of the present invention, detailed description of an ethylenically unsaturated acid monomer constituting the ethylenically unsaturated acid monomer-derived repeating unit included in the internal molded layer may be the same as that of the ethylenically unsaturated acid monomer constituting the ethylenically unsaturated acid monomer-derived repeating unit included in the external molded layer described above. In this case, the ethylenically unsaturated acid monomers constituting the ethylenically unsaturated acid monomer-derived repeating units included in the external molded layer and the internal molded layer may be the same as or different from each other. As a specific example, the ethylenically unsaturated acid monomer included in the internal molded layer may be methacrylic acid.

A content of the ethylenically unsaturated acid monomer-derived repeating unit may be 0.1 wt % to 10 wt %, 0.5 wt % to 9 wt %, or 2 wt % to 8 wt %, with respect to the total content of the internal molded layer. Within these ranges, the dip-molded article is flexible and has excellent wearability, and polymerization stability and tensile strength are excellent.

According to an exemplary embodiment of the present invention, the internal molded layer may further include an ethylenically unsaturated monomer-derived repeating unit formed of another ethylenically unsaturated monomer copolymerizable with the ethylenically unsaturated nitrile-based monomer and the ethylenically unsaturated acid monomer.

Detailed description of the ethylenically unsaturated monomer constituting the ethylenically unsaturated monomer-derived repeating unit included in the internal molded layer may be the same as that of the ethylenically unsaturated monomer constituting the ethylenically unsaturated monomer-derived repeating unit included in the external molded layer described above. In this case, the ethylenically unsaturated monomers constituting the ethylenically unsaturated monomer-derived repeating units included in the external molded layer and the internal molded layer may be the same as or different from each other.

A content of the ethylenically unsaturated monomer-derived repeating unit may be within 20 wt %, 0.01 wt % to 20 wt %, or 0.01 wt % to 15 wt %, with respect to the total content of the internal molded layer. Within these ranges, the dip-molded article has not only excellent texture and wearability but also excellent tensile strength.

According to an exemplary embodiment of the present invention, a ratio of a thickness of the external molded layer and a thickness of the internal molded layer may be 1:9 to 9:1. For example, the ratio of the thickness of the external molded layer and the thickness of the internal molded layer may be 1:4 to 4:1 or 1.5:1 to 2.5:1. The thicknesses of the external molded layer and the internal molded layer are adjusted within the above ranges, such that wearability and chemical resistance of a dip-molded article formed of the external molded layer and the internal molded layer may be simultaneously improved.

In addition, according to the present invention, a method of producing a dip-molded article is provided. The method of producing the dip-molded article may include: a step S10 of attaching a coagulant to a dip molding mold; a step S20 of dipping the dip molding mold to which the coagulant is attached into a first latex composition for dip molding to form a layer derived from the first latex composition for dip molding; a step S30 of dipping the dip molding mold in which the layer derived from the first latex composition for dip molding is formed into a second latex composition for dip molding to form a layer derived from the second latex composition for dip molding; and a step S40 of heating the layer derived from the first latex composition for dip molding and the layer derived from the second latex composition for dip molding to cross-link the first latex composition for dip molding and the second latex composition for dip molding. The first latex composition for dip molding may include a carboxylic acid-modified nitrile-based copolymer latex in which a content of an ethylenically unsaturated nitrile-based monomer-derived repeating unit is 35 wt % to 60 wt %, and the second latex composition for dip molding may include a carboxylic acid-modified nitrile-based copolymer latex in which a content of an ethylenically unsaturated nitrile-based monomer-derived repeating unit is 10 wt % to 28 wt %.

A method of producing the molded article may include a step of dipping the latex composition for dip molding by a direct dipping method, an anode coagulation dipping method, a Teague's coagulation method, or the like. As a specific example, the molded article may be produced by an anode coagulation dipping method, and in this case, a dip-molded article having a uniform thickness may be obtained.

The step S10 is a step of dipping a dip molding mold into a coagulant solution to attach a coagulant to the dip molding mold so as to attach the coagulant to a surface of the dip molding mold. The coagulant solution is a solution obtained by dissolving a coagulant in water, alcohol, or a mixture thereof. A content of the coagulant in the coagulant solution may be 5 wt % to 75 wt %, 7 wt % to 60 wt %, or 15 wt % to 55 wt %, with respect to a total content of the coagulant solution.

The coagulant may be, for example, one or more selected from the group consisting of metal halide such as barium chloride, calcium chloride, magnesium chloride, zinc chloride, or aluminum chloride; nitrate such as barium nitrate, calcium nitrate, or zinc nitrate; acetate such as barium acetate, calcium acetate, or zinc acetate; and sulfate such as calcium sulfate, magnesium sulfate, or aluminum sulfate. As a specific example, the coagulant may be calcium chloride or calcium nitrate.

According to an exemplary embodiment of the present invention, the step S20 may be a step of dipping the dip molding mold to which the coagulant is attached into the first latex composition for dip molding and taking out the dip molding mold to form a layer derived from the first latex composition for dip molding in the dip molding mold, that is, an external molded layer.

In the step S20, the first latex composition for dip molding may include a first carboxylic acid-modified nitrile-based copolymer latex including an ethylenically unsaturated nitrile-based monomer-derived repeating unit, a conjugated diene-based monomer-derived repeating unit, and an ethylenically unsaturated acid monomer-derived repeating unit. In this case, detailed descriptions of the ethylenically unsaturated nitrile-based monomer-derived repeating unit, the conjugated diene-based monomer-derived repeating unit, and the ethylenically unsaturated acid monomer-derived repeating unit may be the same as those of the ethylenically unsaturated nitrile-based monomer-derived repeating unit, the conjugated diene-based monomer-derived repeating unit, and the ethylenically unsaturated acid monomer-derived repeating unit included in the external molded layer of the dip-molded article described above.

The first carboxylic acid-modified nitrile-based copolymer latex may further include an ethylenically unsaturated monomer-derived repeating unit. In this case, detailed description of an ethylenically unsaturated monomer constituting the ethylenically unsaturated monomer-derived repeating unit may be the same as that of the ethylenically unsaturated monomer included in the external molded layer of the dip-molded article described above.

The first carboxylic acid-modified nitrile-based copolymer latex may be prepared by emulsion-polymerizing a monomer mixture constituting the first carboxylic acid-modified nitrile-based copolymer by adding an emulsifier, a polymerization initiator, an activator, a chain transfer agent, a polymerization terminating agent, or the like to the monomer mixture. In this case, in the polymerization, the monomer mixture may be added in the same type and content as those of the monomers included in the external molded layer of the dip-molded article, and an addition method may be selected from a collective addition method, a continuous addition method, and a separate addition method.

In the preparation of the first carboxylic acid-modified nitrile-based copolymer latex, various types of anionic emulsifiers and non-anionic emulsifiers may be used as the emulsifier to impart stability to a latex during the polymerization reaction and after the reaction. Examples of the anionic emulsifier may include alkyl benzene sulfonate such as sodium alkyl benzene sulfonate, alcohol sulfate, alcohol ether sulfonate, alkyl phenol ether sulfonate, alpha olefin sulfonate, paraffin sulfonate, ester sulfosuccinate, and phosphate ester. Examples of the non-anionic emulsifier may include alkyl phenol ethoxylate, fatty amine ethoxylate, fatty acid ethoxylate, and alkanoamide. These emulsifiers may be used alone and in combination of two or more thereof. In addition, the emulsifier may be added in an amount of 0.3 parts by weight to 10 parts by weight, 0.8 parts by weight to 8 parts by weight, or 1.5 parts by weight to 6 parts by weight, with respect to a total content of 100 parts by weight of the monomer mixture. Within these ranges, the polymerization stability is excellent, and a molded article is easily produced due to a small amount of foam.

In addition, in the preparation of the first carboxylic acid-modified nitrile-based copolymer latex, a radical initiator may be used as the polymerization initiator. Examples of the radical initiator may include inorganic peroxide such as sodium persulfate, potassium persulfate, ammonium persulfate, potassium perphosphate, or hydrogen peroxide; organic peroxide such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, or t-butyl peroxy isobutylate; and a nitrogen compound such as azobisisobutyronitrile, azobis-2,4-dimethylvaleronitrile, azobiscyclohexanecarbonitrile, or methyl azobisisobutyrate. The polymerization initiators may be used alone or in combination of two or more thereof. As a specific example, inorganic peroxide may be used as the radical initiator, and as a more specific example, persulfate may be used as the radical initiator. The polymerization initiator may be added in an amount of 0.01 parts by weight to 2 parts by weight, or 0.02 parts by weight to 1.5 parts by weight, with respect to the total content of 100 parts by weight of the monomer mixture. Within these ranges, a polymerization speed may be maintained at an appropriate level.

In addition, in the preparation of the first carboxylic acid-modified nitrile-based copolymer latex, the activator may be one or more selected from the group consisting of sodium formaldehyde sulfoxylate, sodium ethylenediaminetetraacetate, ferrous sulfate, dextrose, sodium pyrophosphate, and sodium sulfite. In addition, the activator may be added in an amount of 0.01 parts by weight to 2.0 parts by weight, 0.02 parts by weight to 1.5 parts by weight, or 0.05 parts by weight to 1.0 part by weight, with respect to the total content of 100 parts by weight of the monomer mixture. Within these ranges, the polymerization speed may be maintained at an appropriate level.

In addition, in the preparation of the first carboxylic acid-modified nitrile-based copolymer latex, examples of the chain transfer agent may include mercaptans such as α-methylstyrenedimer, t-dodecyl mercaptan, n-dodecyl mercaptan, and octyl mercaptan; halogenated hydrocarbons such as carbon tetrachloride, methylene chloride, and methylene bromide; and sulfur-containing compounds such as tetraethylthiuram disulfide, dipentamethylenethiuram disulfide, and diisopropylxanthogen disulfide. These chain transfer agents may be used alone and in combination of two or more thereof. As a specific example, mercaptans may be used as the chain transfer agent. As a more specific example, t-dodecyl mercaptan may be used as the chain transfer agent. The chain transfer agent may be added in an amount of 0.1 parts by weight to 2 parts by weight, 0.2 parts by weight to 1.5 parts by weight, or 0.3 parts by weight to 1 part by weight, with respect to the total content of 100 parts by weight of the monomer mixture. Within these ranges, the polymerization stability is excellent, and physical properties of a molded article when producing the molded article after the polymerization are excellent.

In addition, according to an exemplary embodiment of the present invention, in a method of preparing the first carboxylic acid-modified nitrile-based copolymer latex, the polymerization may be performed in a medium such as water, as a specific example, deionized water. The polymerization may be performed by further including an additive such as a chelating agent, a dispersant, a pH adjuster, a deoxidizer, a particle size adjuster, an anti-aging agent, or an oxygen scavenger, if necessary, to ensure ease of polymerization.

According to an exemplary embodiment of the present invention, the emulsifier, the polymerization initiator, the chain transfer agent, the additive, and the like may be added at the same time, or separately added to a polymerization reactor, together with the monomer mixture, and each addition may be continuously performed.

According to an exemplary embodiment of the present invention, a subsidiary material such as a chelating agent, a dispersant, a pH adjuster, a deoxidizer, a particle size adjuster, an anti-aging agent, or an oxygen scavenger may be added, if necessary, when polymerizing the first carboxylic acid-modified nitrile-based copolymer latex.

The emulsion polymerization may be performed, for example, at a polymerization temperature of 10° C. to 90° C., 20° C. to 80° C., or 25° C. to 75° C. Within these ranges, latex stability is excellent.

Meanwhile, according to an exemplary embodiment of the present invention, in a method of preparing the first latex composition for dip molding, one or more additives selected from the group consisting of a vulcanizing agent, an ionic cross-linking agent, a pigment, a filler, a thickener, and a pH adjuster may be added to the first carboxylic acid-modified nitrile-based copolymer latex described above. In this case, the vulcanizing agent, the ionic cross-linking agent, the pigment, the filler, the thickener, and the pH adjuster may be those commonly used in the preparation of the latex composition for dip molding, and are not particularly limited.

A content of the first carboxylic acid-modified nitrile-based copolymer latex included in the first latex composition for dip molding may be 80 wt % to 99 wt %, 85 wt % to 98 wt %, or 88 wt % to 97 wt %. A layer derived from the first latex composition for dip molding is formed by using the first latex composition for dip molding including the first carboxylic acid-modified nitrile-based copolymer latex in the above content range, such that physical properties of the dip-molded article may be improved.

According to an exemplary embodiment of the present invention, a solid content (concentration) of the first latex composition for dip molding may be 10 wt % to 20 wt %, 12 wt % to 20 wt %, or 15 wt % to 20 wt %. Within these ranges, latex transport efficiency is excellent, and an increase in viscosity of the latex is prevented, such that storage stability is excellent.

According to an exemplary embodiment of the present invention, a pH of the first latex composition for dip molding may be 8 to 12, 9 to 11, or 9.3 to 10.5. Within these ranges, processability and productivity when producing a dip-molded article are excellent. The pH of the latex composition for dip molding may be adjusted by addition of the pH adjuster described above. Examples of the pH adjuster may include an aqueous potassium hydroxide solution having a concentration of 1 wt % to 5 wt %, and ammonia water having a concentration of 1 wt % to 5 wt %.

According to an exemplary embodiment of the present invention, in the step S20, a dipping time may be 5 seconds to 20 seconds, 5 seconds to 15 seconds, or 6 seconds to 12 seconds. A thickness of the layer derived from the first latex composition for dip molding may be adjusted by controlling the dipping time in the step S20 within the above ranges.

According to an exemplary embodiment of the present invention, the method of producing the dip-molded article may further include a step of performing a heating treatment at a predetermined temperature or higher to evaporate a water component after the step S20.

According to an exemplary embodiment of the present invention, the step S30 may be a step of dipping the dip molding mold in which the layer derived from the first latex composition for dip molding is formed into a second latex composition for dip molding and taking out the dip molding mold to form a layer derived from the second latex composition for dip molding, that is, an internal molded layer.

In the step S30, the second latex composition for dip molding may include a second carboxylic acid-modified nitrile-based copolymer latex including an ethylenically unsaturated nitrile-based monomer-derived repeating unit, a conjugated diene-based monomer-derived repeating unit, and an ethylenically unsaturated acid monomer-derived repeating unit. In this case, detailed descriptions of the ethylenically unsaturated nitrile-based monomer-derived repeating unit, the conjugated diene-based monomer-derived repeating unit, and the ethylenically unsaturated acid monomer-derived repeating unit may be the same as those of the ethylenically unsaturated nitrile-based monomer-derived repeating unit, the conjugated diene-based monomer-derived repeating unit, and the ethylenically unsaturated acid monomer-derived repeating unit included in the internal molded layer of the dip-molded article described above.

The second carboxylic acid-modified nitrile-based copolymer latex may further include an ethylenically unsaturated monomer-derived repeating unit. In this case, detailed description of an ethylenically unsaturated monomer constituting the ethylenically unsaturated monomer-derived repeating unit may be the same as that of the ethylenically unsaturated monomer included in the internal molded layer of the dip-molded article described above.

The second carboxylic acid-modified nitrile-based copolymer latex may be prepared by emulsion-polymerizing the monomer mixture constituting the first carboxylic acid-modified nitrile-based copolymer by adding an emulsifier, a polymerization initiator, an activator, a chain transfer agent, a polymerization terminating agent, or the like to the monomer mixture. In this case, detailed descriptions of polymerization conditions, additives, and the like in the emulsion polymerization of the second carboxylic acid-modified nitrile-based copolymer latex may be the same as those of the polymerization conditions, additives, and the like of the first carboxylic acid-modified nitrile-based copolymer latex described above.

According to an exemplary embodiment of the present invention, in a method of preparing the second latex composition for dip molding, one or more additives selected from the group consisting of a vulcanizing agent, an ionic cross-linking agent, a pigment, a filler, a thickener, and a pH adjuster may be added to the second carboxylic acid-modified nitrile-based copolymer latex described above. In this case, the vulcanizing agent, the ionic cross-linking agent, the pigment, the filler, the thickener, and the pH adjuster may be those commonly used in the preparation of the latex composition for dip molding, and are not particularly limited.

A content of the second carboxylic acid-modified nitrile-based copolymer latex included in the second latex composition for dip molding may be 80 wt % to 99 wt %, 85 wt % to 98 wt %, or 88 wt % to 97 wt %. A layer derived from the second latex composition for dip molding is formed by using the second latex composition for dip molding including the second carboxylic acid-modified nitrile-based copolymer latex in the above content range, such that physical properties of the dip-molded article may be improved.

According to an exemplary embodiment of the present invention, a solid content (concentration) of the second latex composition for dip molding may be 21 wt % to 35 wt %, 21 wt % to 32 wt %, or 21 wt % to 30 wt %. Within these ranges, latex transport efficiency is excellent, and an increase in viscosity of the latex is prevented, such that storage stability is excellent.

According to an exemplary embodiment of the present invention, a pH of the second latex composition for dip molding may be 8 to 12, 9 to 11, or 9.3 to 10.5. Within these ranges, processability and productivity when producing a dip-molded article are excellent. The pH of the latex composition for dip molding may be adjusted by addition of the pH adjuster described above. Examples of the pH adjuster may include an aqueous potassium hydroxide solution having a concentration of 1 wt % to 5 wt %, and ammonia water having a concentration of 1 wt % to 5 wt %.

According to an exemplary embodiment of the present invention, in the step S30, a dipping time may be 5 seconds to 20 seconds, 5 seconds to 18 seconds, or 6 seconds to 14 seconds. A thickness of the layer derived from the second latex composition for dip molding may be adjusted by controlling the dipping time in the step S30 within the above ranges.

According to an exemplary embodiment of the present invention, the method of producing the dip-molded article may further include a step of performing a heating treatment at a predetermined temperature or higher to evaporate a water component after the step S30.

According to an exemplary embodiment of the present invention, the step S40 may be a step of heating the layer derived from the first latex composition for dip molding and the layer derived from the second latex composition for dip molding that are formed in the dip molding mold to evaporate a water component, and cross-linking the first latex composition for dip molding and the second latex composition for dip molding to cure them, so as to obtain a dip-molded article.

As such, the layer derived from the first latex composition for dip molding and the layer derived from the second latex composition for dip molding that have the ethylenically unsaturated nitrile-based monomer-derived repeating units in different contents and the dip-molded article is prepared through cross-linking, such that wearability and chemical resistance may be simultaneously improved.

According to an exemplary embodiment of the present invention, after the step S40, the layer derived from the first latex composition for dip molding and the layer derived from the second latex composition for dip molding that are cross-linked by the heat treatment in the step S40 may be removed from the dip molding mold to obtain a dip-molded article.

According to an exemplary embodiment of the present invention, the molded article may be a glove such as a surgical glove, an examination glove, an industrial glove, or a household glove, a condom, a catheter, or a health care product.

Hereinafter, the present invention will be described in more detail by examples. However, the following examples are provided for illustrating the present invention. It is apparent to a person skilled in the art that various modifications and alterations may be made without departing from the scope and spirit of the present invention, and the scope of the present invention is not limited thereto.

PREPARATION EXAMPLES

Preparation Example 1

Preparation of First Carboxylic Acid-Modified Nitrile-Based Copolymer Latex

After a 10 L high-pressure reactor being equipped with a stirrer, a thermometer, a cooler, and an inlet port of nitrogen gas and allowing for continuous addition of monomers, an emulsifier, and a polymerization initiator was purged with nitrogen, 2.4 parts by weight of sodium alkyl benzene sulfonate, 0.6 parts by weight of t-dodecyl mercaptan, and 140 parts by weight of ion exchange water were added to 100 parts by weight of a monomer mixture composed of 39 wt % of acrylonitrile, 57 wt % of 1,3-butadiene, and 4 wt % of methacrylic acid, and a temperature was raised to 40° C.

After the temperature was raised, 0.3 parts by weight of potassium persulfate as a polymerization initiator was added, and the polymerization was terminated by adding 0.1 parts by weight of sodium dimethyldithiocarbamate at the point where a polymerization conversion rate reached 95%. Unreacted monomers were removed through a deodorization process, and ammonia water, an antioxidant, a defoaming agent, and the like were added, to obtain a first dip carboxylic acid-modified nitrile-based copolymer latex (latex-A) having a solid content concentration of 45% and a pH of 8.5.

Preparation of First Latex Composition for Dip Molding

To 100 wt % (based on a solid content) of the prepared latex-A, 1 wt % of sulfur, 1 wt % of zinc dibutyldithiocarbamate (ZDBC), 1.3 wt % of zinc oxide, 1.0 wt % of titanium oxide, 1.6 wt % of a potassium hydroxide solution, and secondary distilled water were added, to obtain a first latex composition for dip molding (composition-A) having a pH of 10 and a solid content concentration of 18 wt % to 25 wt %.

Preparation Example 2

Preparation of Second Carboxylic Acid-Modified Nitrile-Based Copolymer Latex

After a 10 L high-pressure reactor being equipped with a stirrer, a thermometer, a cooler, and an inlet port of nitrogen gas and allowing for continuous addition of monomers, an emulsifier, and a polymerization initiator was purged with nitrogen, 3 parts by weight of sodium alkyl benzene sulfonate, 0.7 parts by weight of t-dodecyl mercaptan, and 140 parts by weight of ion exchange water were added to 100 parts by weight of a monomer mixture composed of 24 wt % of acrylonitrile, 72 wt % of 1,3-butadiene, and 4 wt % of methacrylic acid, and a temperature was raised to 40° C.

After the temperature was raised, 0.3 parts by weight of potassium persulfate as a polymerization initiator was added, and the polymerization was terminated by adding 0.1 parts by weight of sodium dimethyldithiocarbamate at the point where a polymerization conversion rate reached 95%. Unreacted monomers were removed through a deodorization process, and ammonia water, an antioxidant, a defoaming agent, and the like were added, to obtain a second dip carboxylic acid-modified nitrile-based copolymer latex (latex-B) having a solid content concentration of 45% and a pH of 8.5.

Preparation of Second Latex Composition for Dip Molding

To 100 wt % (based on a solid content) of the prepared latex-B, 1 wt % of sulfur, 1 wt % of zinc dibutyldithiocarbamate (ZDBC), 1.3 wt % of zinc oxide, 1.0 wt % of titanium oxide, 1.6 wt % of a potassium hydroxide solution, and secondary distilled water were added, to obtain a second latex composition for dip molding (composition-B) having a pH of 10 and a solid content concentration of 18 wt % to 25 wt %.

Preparation Example 3

Preparation of Third Carboxylic Acid-Modified Nitrile-Based Copolymer Latex

After a 10 L high-pressure reactor being equipped with a stirrer, a thermometer, a cooler, and an inlet port of nitrogen gas and allowing for continuous addition of monomers, an emulsifier, and a polymerization initiator was purged with nitrogen, 3 parts by weight of sodium alkyl benzene sulfonate, 0.7 parts by weight of t-dodecyl mercaptan, and 140 parts by weight of ion exchange water were added to 100 parts by weight of a monomer mixture composed of 31 wt % of acrylonitrile, 63 wt % of 1,3-butadiene, and 6 wt % of methacrylic acid, and a temperature was raised to 40° C.

After the temperature was raised, 0.3 parts by weight of potassium persulfate as a polymerization initiator was added, and the polymerization was terminated by adding 0.1 parts by weight of sodium dimethyldithiocarbamate at the point where a polymerization conversion rate reached 95%. Unreacted monomers were removed through a deodorization process, and ammonia water, an antioxidant, a defoaming agent, and the like were added, to obtain a third dip carboxylic acid-modified nitrile-based copolymer latex (latex-C) having a solid content concentration of 45% and a pH of 8.5.

Preparation of Second Latex Composition for Dip Molding

To 100 wt % (based on a solid content) of the prepared latex-C, 1 wt % of sulfur, 1 wt % of zinc dibutyldithiocarbamate (ZDBC), 1.3 wt % of zinc oxide, 1.0 wt % of titanium oxide, 1.6 wt % of a potassium hydroxide solution, and secondary distilled water were added, to obtain a second latex composition for dip molding (composition-C) having a pH of 10 and a solid content concentration of 18 wt % to 25 wt %.

EXAMPLES

Example 1

Production of Dip-Molded Article 15 parts by weight of calcium nitrate, 84.5 parts by weight of distilled water, and 0.5 parts by weight of a wetting agent (Teric 320, produced by Huntsman Corporation, Australia) were mixed with each other to prepare a coagulant solution. A hand-shaped ceramic dip molding mold was dipped into the solution for 8 seconds and taken out from the solution, and the hand-shaped mold was dried at 120° C. for 2 minutes and 30 seconds, thereby applying a coagulant to the hand-shaped mold (S10).

Thereafter, the dip molding mold to which the coagulant was applied was dipped into the prepared composition-A having the solid content concentration of 18 wt % for 8 seconds and pulled up, and then the dip molding mold was dried at 120° C. for 30 seconds (S20). Thereafter, the dip molding mold was dipped into the prepared composition-B having the solid content concentration of 25 wt % for 12 seconds and pulled up, and the dip molding mold was dried at 80° C. for 30 seconds and then was dipped into water or warm water for 30 seconds (S30). Thereafter, the dip molding mold was subjected to cross-linking at 120° C. for 20 minutes (S40). A cross-linked dip-molded layer was removed from the hand-shaped mold, thereby obtaining a dip-molded article having a glove shape.

Example 2

A dip-molded article having a glove shape was obtained in the same manner as that of Example 1, except that the dip molding mold was dipped into the composition-A having the solid content concentration of 18 wt % for 10 seconds instead of 8 seconds in the step S20, and the dip molding mold was dipped into the composition-B having the solid content concentration of 25 wt % for 8 seconds instead of 12 seconds in the step S30 in Example 1.

COMPARATIVE EXAMPLES

Comparative Example 1

A dip-molded article having a glove shape was obtained in the same manner as that of Example 1, except that the dip molding mold was dipped into the composition-A having the solid content concentration of 25 wt % instead of into the composition-B having the solid content concentration of 25 wt % in step S30 in Example 1.

Comparative Example 2

A dip-molded article having a glove shape was obtained in the same manner as that of Example 1, except that the dip molding mold was dipped into the composition-B having the solid content concentration of 18 wt % instead of into the composition-A having the solid content concentration of 18 wt % in step S20 in Example 1.

Comparative Example 3

A dip-molded article having a glove shape was obtained in the same manner as that of Example 2, except that the dip molding mold was dipped into the composition-A having the solid content concentration of 25 wt % instead of into the composition-B having the solid content concentration of 25 wt % in step S30 in Example 2.

Comparative Example 4

A dip-molded article having a glove shape was obtained in the same manner as that of Example 2, except that the dip molding mold was dipped into the composition-B having the solid content concentration of 18 wt % instead of into the composition-A having the solid content concentration of 18 wt % in step S20 in Example 2.

Comparative Example 5

A dip-molded article having a glove shape was obtained in the same manner as that of Example 1, except that the dip molding mold was dipped into the composition-B having the solid content concentration of 18 wt % instead of into the composition-A having the solid content concentration of 18 wt % in step S20, and the dip molding mold was dipped into the composition-A having the solid content concentration of 25 wt % instead of into the composition-B having the solid content concentration of 25 wt % in step S30 in Example 1.

Comparative Example 6

A dip-molded article having a glove shape was obtained in the same manner as that of Example 2, except that the dip molding mold was dipped into the composition-B having the solid content concentration of 18 wt % instead of into the composition-A having the solid content concentration of 18 wt % in step S20, and the dip molding mold was dipped into the composition-A having the solid content concentration of 25 wt % instead of into the composition-B having the solid content concentration of 25 wt % in step S30 in Example 2.

Comparative Example 7

A dip-molded article having a glove shape was obtained in the same manner as that of Example 1, except that the dip molding mold was dipped into the composition-C having the solid content concentration of 18 wt % instead of into the composition-A having the solid content concentration of 18 wt % in step S20, and the dip molding mold was dipped into the composition-C having the solid content concentration of 25 wt % instead of into the composition-B having the solid content concentration of 25 wt % in step S30 in Example 1.

EXPERIMENTAL EXAMPLE

Experimental Example 1

In the dip-molded articles produced in Examples 1 and 2 and Comparative Examples 1 to 7, types and solid content concentrations of the compositions used in the step S20 and the step S30, thicknesses of the molded layers, stress (modulus) at an elongation of 300%, a stress retention, chemical resistance, and durability of each of the dip-molded articles were measured under the following conditions, and the results are shown in Table 1.

Stress at elongation of 300% (modulus of 300%) (MPa): Dumbbell-shaped specimens were prepared from the dip-molded articles obtained in the examples and the comparative examples according to EN 455-2. Subsequently, the specimen was pulled using a universal testing machine (UTM) at a stretching rate of 500 mm/min, tensile strength and elongation at break were measured, and texture at stress at the point where the elongation was 300% was measured. As the tensile strength and the elongation are high, the quality of the dip-molded article is excellent, and as a value of the stress at the point where the elongation is 300% is low, the wearability of the dip-molded article is excellent and the quality is thus excellent.

Stress retention (%): Dumbbell-shaped specimens were prepared from the dip-molded articles obtained in the examples and the comparative examples according to EN 455-2, a standard zone of 20 mm of each of both ends of the specimen was stretched at a rate of 500 mm/min and the stretching was stopped at the point where the standard zone reached 40 mm (elongation of 100%). The stress M100 (0) at this time was measured, and the stress M100 (5) after 5 minutes elapsed was measured. A value of M100 (5) to M100 (0) was calculated as a percentage, and the calculated value was defined as a stress retention. In this case, it is determined that the larger the value, the better the wearability.

Chemical resistance (min): Specimens were prepared from the dip-molded articles obtained in the examples and the comparative examples according to EN374-3:2003. Subsequently, a time taken for the specimen to pass through isopropyl alcohol of GC-FID and the isopropyl alcohol to pass through the specimen at a rate of 1 μg/cm$^2$/min was measured as a minute (min). At this time, the longer the time means the better the chemical resistance.

Durability (times): A solution for measurement of durability of the dip-molded article at 25° C. consisting of 16 parts by weight of sodium chloride, 16 parts by weigh of lactic acid, 3.2 parts by weight of urea, and 64.8 parts by weight of water was prepared. Thereafter, the specimen of the dip-molded article obtained in each of the examples and the comparative examples was inserted into a durability measuring device, the specimen was repeatedly stretched by 2 times the initial length (at most 2.6 times when stretched, at least 1 time when shrunk), and the number of times until the specimen was broken was measured. At this time, it is determined that the higher the number of times, the better the durability.

TABLE 1

| | (S20) | | | (S30) | | | | | |
|---|---|---|---|---|---|---|---|---|---|
| | Composition | Solid content concentration (wt %) | Thickness (μm) | Composition | Solid content concentration (wt %) | Thickness (μm) | Modulus of 300% (MPa) | Stress retention (%) | Chemical resistance (min.) | Durability (times) |
| Example 1 | A | 18 | 64 | B | 25 | 35 | 4.55 | 47.2 | 29.3 | 609 |
| Example 2 | A | 18 | 66 | B | 25 | 28 | 4.59 | 43.6 | 22.3 | 710 |
| Comparative Example 1 | A | 18 | 64 | A | 25 | 32 | 5.98 | 43.0 | 61.1 | 668 |
| Comparative Example 2 | B | 18 | 63 | B | 25 | 35 | 2.93 | 54.6 | 0.0 | 622 |
| Comparative Example 3 | A | 18 | 66 | A | 25 | 26 | 5.48 | 40.3 | 40.2 | 853 |
| Comparative Example 4 | B | 18 | 68 | B | 25 | 26 | 2.97 | 56.7 | 0.0 | 654 |
| Comparative Example 5 | B | 18 | 63 | A | 25 | 31 | 4.81 | 44.8 | 3.0 | 612 |
| Comparative Example 6 | B | 18 | 65 | A | 25 | 26 | 4.67 | 45.0 | 1.5 | 620 |
| Comparative Example 7 | C | 18 | 67 | C | 25 | 31 | 5.51 | 36.0 | 7.0 | 550 |

Referring to Table 1, it was confirmed that in Examples 1 and 2 in which the dip-molded article was produced by sequentially dipping the dip molding mold into the composition-A including the ethylenically unsaturated nitrile-based monomer-derived repeating unit in a high content and the composition-B including the ethylenically unsaturated nitrile-based monomer-derived repeating unit in a low content, the modulus of 300% and the stress retention were excellent as compared to those in Comparative Examples 1 and 3 in which the dip-molded article was produced by dipping the dip molding mold into only the composition-A including the ethylenically unsaturated nitrile-based monomer-derived repeating unit in a high content, and the wearability of each of the dip-molded articles of Examples 1 and 2 was excellent.

In addition, it could be confirmed that in Comparative Examples 2 and 4 in which the dip-molded article was produced by dipping the dip molding mold into only the composition-B including the ethylenically unsaturated nitrile-based monomer-derived repeating unit in a low content, the chemical resistance was deteriorated as compared to those in Examples 1 and 2.

In addition, it was confirmed that in Comparative Examples 5 and 6 in which the dip-molded article was produced by sequentially dipping the dip molding mold into the composition-B including the ethylenically unsaturated nitrile-based monomer-derived repeating unit in a low content and the composition-A including the ethylenically unsaturated nitrile-based monomer-derived repeating unit in a high content, the chemical resistance was significantly deteriorated as compared to those in Examples 1 and 2. It was confirmed that this was because the external molded layer occupying about ⅔ of the total thickness of the molded article was formed of the composition-B including the ethylenically unsaturated nitrile-based monomer-derived repeating unit in a low content.

In addition, it could be confirmed that in Comparative Example 7 in which the dip-molded article was produced by dipping the dip molding mold into only the composition-C including the ethylenically unsaturated nitrile-based monomer-derived repeating unit in a content at an intermediate level between the contents in the composition-A and the composition-B, the modulus of 300%, all of the stress retention, and the chemical resistance were deteriorated as compared to those in Examples 1 and 2.

The invention claimed is:

1. A dip-molded article comprising:
    an external molded layer in which a content of an ethylenically unsaturated nitrile-based monomer-derived repeating unit is 35 wt % to 60 wt %; and
    an internal molded layer in which a content of an ethylenically unsaturated nitrile-based monomer-derived repeating unit is 10 wt % to 28 wt %.

2. The dip-molded article of claim 1, wherein each of the external molded layer and the internal molded layer further includes a conjugated diene-based monomer-derived repeating unit and an ethylenically unsaturated acid monomer-derived repeating unit.

3. The dip-molded article of claim 2, wherein a content of the conjugated diene-based monomer-derived repeating unit included in the external molded layer is 30 wt % to 65 wt %, and a content of the ethylenically unsaturated acid monomer-derived repeating unit included in the external molded layer is 0.1 wt % to 10 wt %.

4. The dip-molded article of claim 2, wherein a content of the conjugated diene-based monomer-derived repeating unit included in the internal molded layer is 60 wt % to 90 wt %, and a content of the ethylenically unsaturated acid monomer-derived repeating unit included in the internal molded layer is 0.1 wt % to 10 wt %.

5. The dip-molded article of claim 1, wherein a ratio of a thickness of the external molded layer and a thickness of the internal molded layer is 1:9 to 9:1.

6. The dip-molded article of claim 1, wherein a ratio of a thickness of the external molded layer and a thickness of the internal molded layer is 1.5:1 to 2.5:1.

* * * * *